United States Patent [19]
Lehrer

[11] Patent Number: 5,958,478
[45] Date of Patent: *Sep. 28, 1999

[54] FILTRATION DEVICE FOR PREPARATION OF FOODS FROM FOOD CONCENTRATES AND LIQUIDS

[76] Inventor: Robert Lehrer, 1502 Seton Villa La., Wilmington, Del. 19809

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/616,157

[22] Filed: Mar. 14, 1996

Related U.S. Application Data

[60] Provisional application No. 60/006,512, Nov. 9, 1995, abandoned.

[51] Int. Cl.⁶ .............................. B65B 29/02; C12C 3/08; A23L 3/08; A23L 1/28
[52] U.S. Cl. ................................ 426/77; 426/78; 426/79; 426/82; 426/487; 426/422; 426/424; 426/425; 210/501; 210/502.1; 210/777
[58] Field of Search ..................................... 426/417, 487, 426/488, 506, 77, 78, 79, 82, 84, 422, 424, 425; 210/501, 502.1, 777

[56] References Cited

U.S. PATENT DOCUMENTS

| | | | |
|---|---|---|---|
| 3,607,297 | 9/1971 | Fasano | 426/433 |
| 3,615,595 | 10/1971 | Guttag | 426/85 |
| 4,532,142 | 7/1985 | Dean | 426/388 |
| 4,579,658 | 4/1986 | Moller . | |
| 5,567,461 | 10/1996 | Lehrer | 426/417 |

FOREIGN PATENT DOCUMENTS 0658780  12/1986  Switzerland .............................. 426/77

*Primary Examiner*—Anthony J. Weier
*Attorney, Agent, or Firm*—Connolly, Bove Lodge & Hutz LLP

[57] ABSTRACT

A filtration device for the preparation of foods from food concentrates and liquids includes a composite formed from a plurality of layers having a food preparation applicator secured to the composite at the fluid contact region of the composite. The food preparation applicator includes food concentrate so as to result in a dispensing structure having the food concentrate therein which applies the food concentrate to liquid flowing through the applicator so as to mix the food concentrate with the liquid in the food preparation. The device may also include pockets containing treating material for removing contaminants.

21 Claims, 4 Drawing Sheets

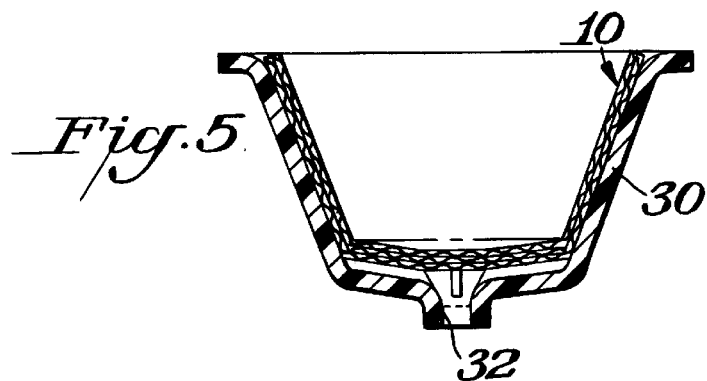
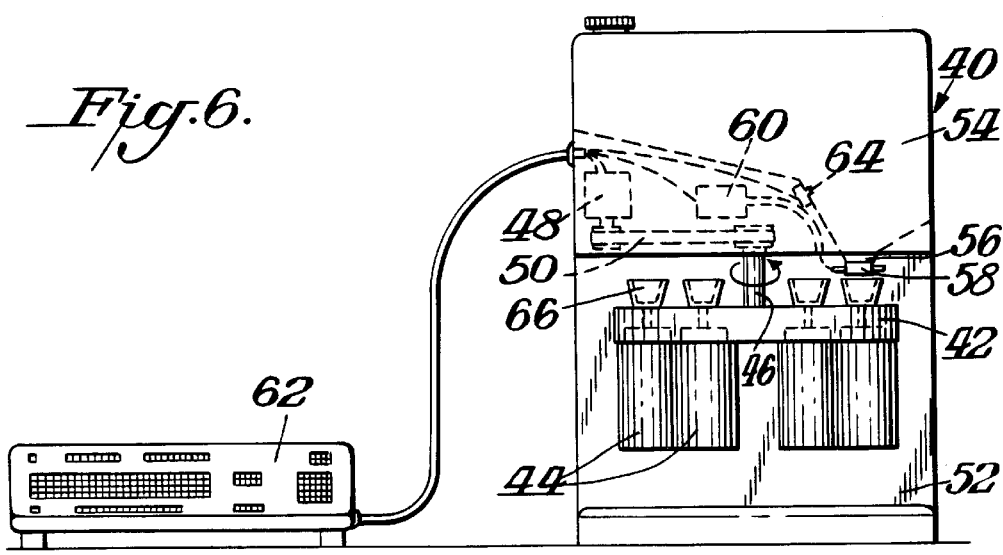
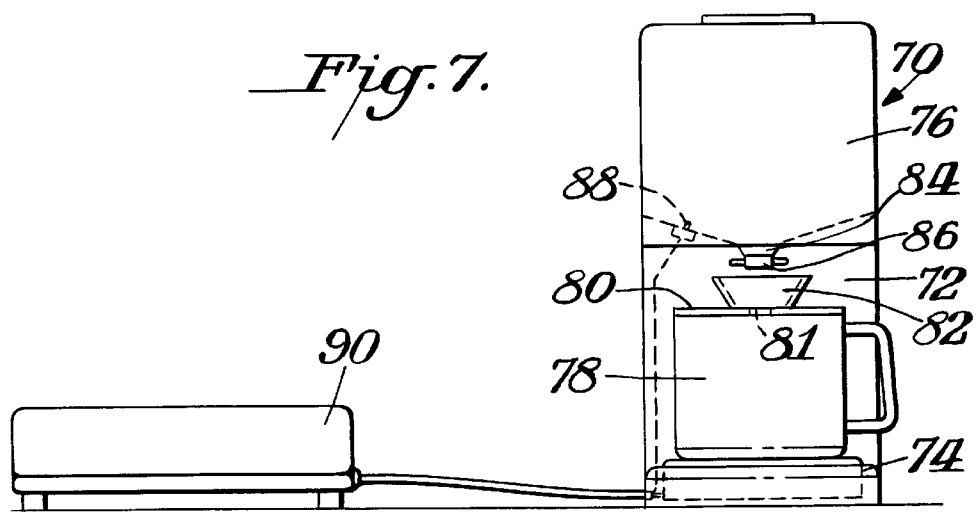

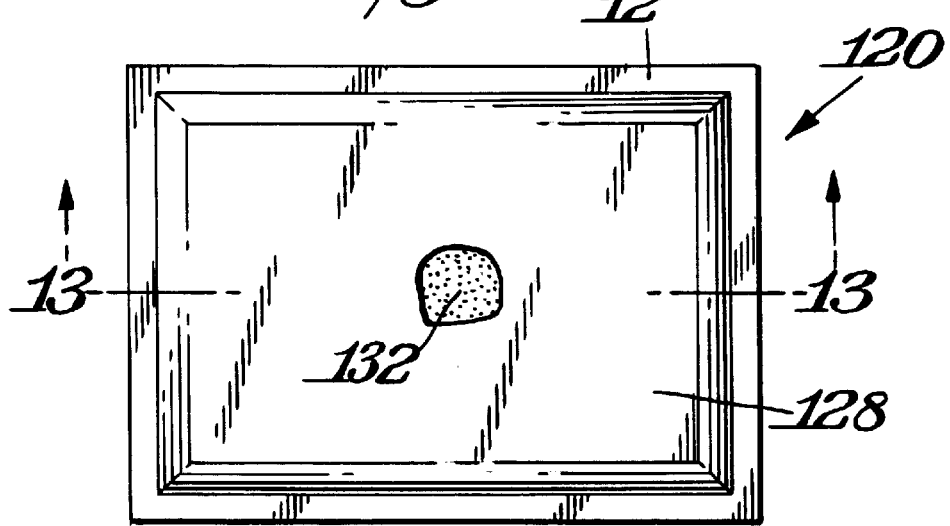
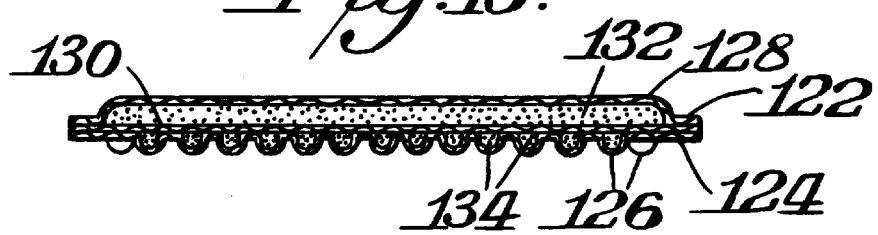
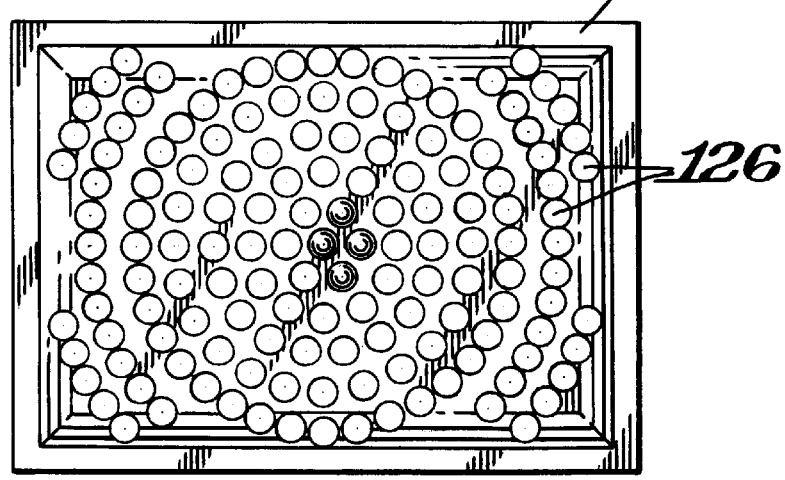

FILTRATION DEVICE FOR PREPARATION OF FOODS FROM FOOD CONCENTRATES AND LIQUIDS

CROSS-REFERENCE TO RELATED APPLICATION

This application is based upon and claims benefit under 35 USC 119 (e) to provisional application Ser. No. 60/006,512 filed Nov. 9, 1995 now abandoned.

BACKGROUND OF THE INVENTION

Various forms of filter devices have been used in connection with the preparation of foods from food concentrates and liquids. In such devices a fluid or liquid such as water is mixed with a food concentrate and the liquid passes through some form of filter to remove undesired chemicals or contaminants therefrom.

SUMMARY OF THE INVENTION

An object of this invention is to provide a filtration device for the preparation of food from food concentrates and liquids.

In accordance with this invention a suitable filter device may be used in which the food concentrate is contained within an additional barrier layer or porous layer added to the filter device and the liquid would flow through the filter device.

THE DRAWINGS

FIG. 5 is a cross-sectional view in elevation showing the filtration device of FIGS. 1–2 mounted in a basket;

FIG. 6 is a schematic elevational view showing the filtration device of this invention used in a programmable assembly;

FIG. 7 is a modified form of programmable assembly utilizing the filtration device of this invention;

FIG. 11 is a top plan view of yet another form of filtration device in accordance with this invention;

FIG. 12 is a bottom plan view of the device shown in FIG. 11; and

FIG. 13 is a cross-sectional view taken through FIG. 11 along the line 13—13.

DETAILED DESCRIPTION

This invention involves the preparation of foods from concentrates and water (or alternate consumable liquid) in a device which permits the active treatment by filtration, or other means, of the food or the water or other consumable liquid in order to remove undesirable chemicals or dissolved or suspended metals or other particulate matter from the liquid prior to or after mixing with the food concentrate and then which dispenses the liquid food in a preselected or predetermined way to collection vessels.

In one example, the food concentrate and the filtration device may be combined in a multilayer structure which utilizes the invention taught in my U.S. Pat. No. 5,304,305 and in my application Ser. No. 239,581, filed May 9, 1994 (in which cleansing adsorbents are contained in geometrically arranged pockets within a barrier layer between two layers which are porous only at the location of the pockets) and in which the food concentrate is contained within an additional barrier layer and/or by an additional porous layer. (All of the details of U.S. Pat. No. 5,304,305 and Ser. No. 239,581 are incorporated herein by reference thereto.) This filter can then be placed in a compartment of a suitably designed manual, electric or other device in which water or the alternate liquid (heated, cold or at ambient temperature) from a reservoir or from a container or directly from a water supply is made to flow through the filter pockets, then through a natural gravitational or mechanical or sonic or other means of mixing as appropriate, and then to a collection vessel or vessels.

In a specific example of a device, empty vessels are positioned on a carousel which rotates or moves so as to enable such vessels to be filled in a preselected or programmed way (or simultaneously) with specific programmed quantities of the food. In this example and in general, the liquid may be acted upon by the filter either prior to or after contacting the food concentrate, the order depending upon how the multilayer filter is situated relative to the desired or intended path of liquid flow. Control of operation of this device may be accomplished electro-mechanically through or application of a suitable computer type chip or other suitable means and a simple keypad or electro-mechanical switch or control device for data entry by a user.

Figure 1:
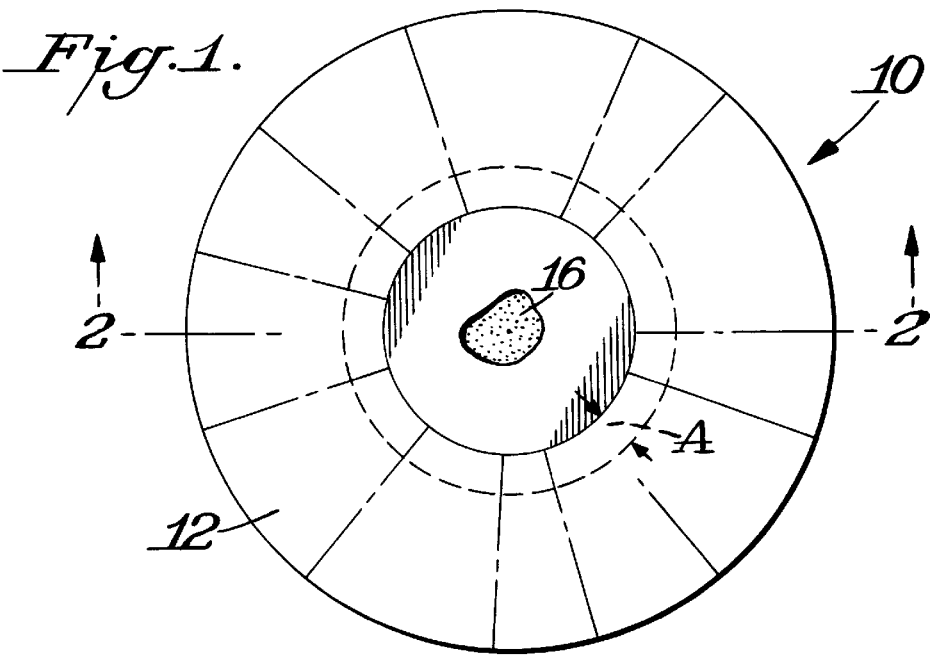
FIG. 1 is a top plan view partly broken away of a filtration device in accordance with this invention.
Figure 2:
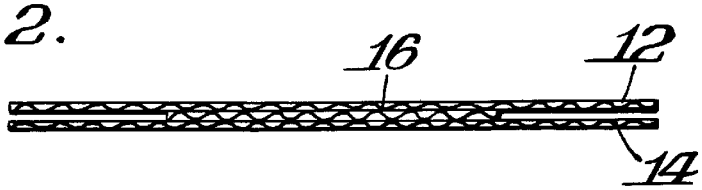
FIG. 2 is a cross-sectional view taken through FIG. 1 along the line 2—2.

FIGS. 1–2 illustrate a simplified form of food preparation device 10 in accordance with this invention. As shown therein device 10 includes composite comprising a pair of layers 12,14 which are secured together to form a laminate. An intermediate layer 16 is disposed between layers 12 and 14 within the circular central area designated by the letter A. Layer 16 functions as a barrier layer and is impregnated or filled with food concentrate of the type disclosed in Ser. No. 239,581. Layers 12 and 14 are porous at least in the central liquid or fluid contacting area directly above and below layer 16. As a result, water or other liquid passing through the central fluid contact region would be mixed with the food concentrate in layer 16 so as to create a flavored or liquid food from the mixture of liquid and concentrate.

Figure 3:
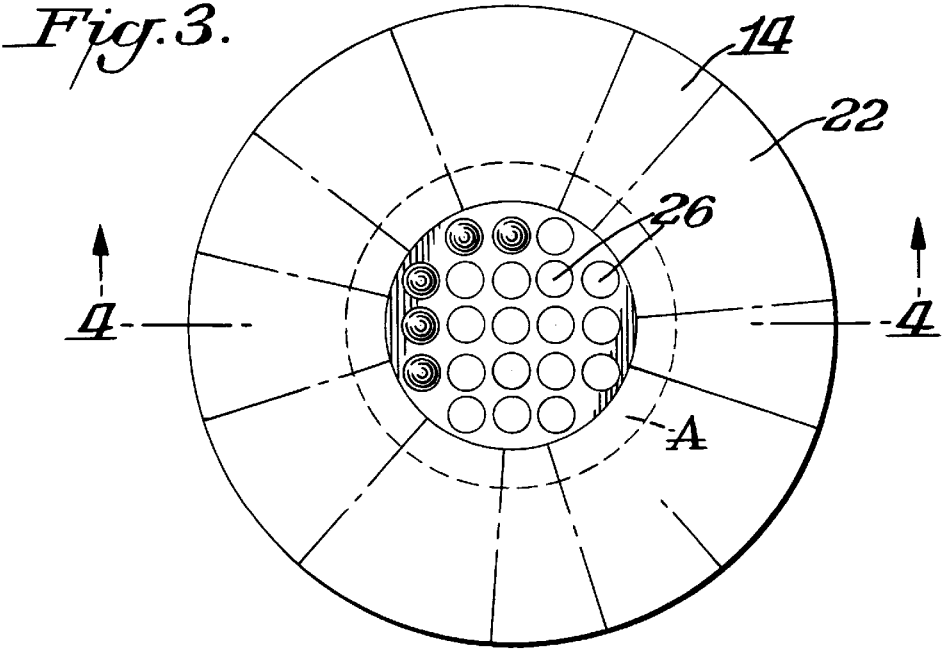
FIG. 3 is a top plan view of a modified form of filtration device in accordance with this invention.
Figure 4:
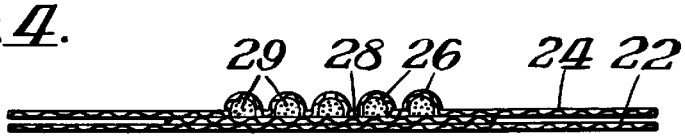
FIG. 4 is a cross-sectional view taken through FIG. 3 along the line 4—4.

FIGS. 3–4 show a variation wherein the food preparation device 20 is generally formed along the lines of the filter member described in U.S. Pat. No. 5,304,305. As shown in FIGS. 3–4 a composite is formed from layers 22,24 with pockets 26 being formed at one of the layers, namely layer 22 in the central fluid contact region of the device. Device 20 differs from the filter device in U.S. Pat. No. 5,304,305 in that an intermediate layer 28 is provided between layers 22,24 within the circular central area A. Intermediate layer 28 functions as a food preparation applicator in that it includes food concentrate therein so as to act as a dispensing structure for mixing the food concentrate with fluid such as water passing through the central fluid contacting region. A further advantage of device 20 is that pockets 26 may incorporate a treating substance such as filter material or additional food concentrate to purify and/or further enhance the resultant food created by the fluid passing through and mixing with the food concentrate. If desired, the pockets 26 could be placed in an upstream direction with respect to the direction of flow of liquid so as to, for example, provide a preliminary filtering step to the liquid before the liquid contacts the food concentrate. Alternatively, the pocket could be placed on the downstream side so as to filter the mixture of liquid and food concentrate.

In the embodiment of FIGS. 3–4 at least one of the layers and preferably both layers is liquid impermeable except for the areas of the pockets 26 so as to assure that all of the liquid will be forced to flow through the pockets 26 as described in U.S. Pat. No. 5,304,305. If desired both layers may be entirely liquid permeable.

FIG. 5 shows the use of a filtration device such as device 10 mounted in a basket 30 such as used in the brewing of coffee. In use a liquid such as water would be directed into the basket and would flow through the central fluid contact region at the base of the basket through the layers 12, 14 and 16 and then be dispensed through outlet 32. By passing through layer 16 the liquid mixes with the food concentrate so that the liquid flowing through outlet 32 is a mixture of the original liquid and the food concentrate. The invention may also be practiced by incorporating other food materials in the basket on top of device 10, such as ground coffee and the food concentrate in layer 16 could, for example, be sugar, powdered creme, etc. whereby the resultant liquid is a sweetened and/or lightened coffee.

FIG. 6 shows an automatic system 40 which may be utilized in the practice of this invention. As shown therein a carousel 42 is provided to which is mounted a plurality of containers 44. Carousel 42 and the containers 44 held thereby are rotated about shaft 46 by means of motor 48 through transmission linkage such as belts and shafts 50. The carousel 42 and related components are mounted within housing 52 which may include a liquid reservoir section at its upper end leading to a dispensing spout 56. Alternatively, some other form of liquid supply may be provided without requiring the housing. Flow through outlet 56 is controlled by a valve 58 which may be suitably actuated such as by means of a solenoid 60. In this practice of the invention the dispensing of liquid to the containers 44 is programmed in any suitable manner such as electro-mechanically or by means of a computer type chip and a key pad 62 for data entry to control various operating parameters and conditions. These parameters and conditions could include, for example, the time and quantity of flow of liquid to each container 44 as well as the temperature of the liquid. For example, the temperature sensor 64 could be provided to indicate when a predetermined temperature of the liquid has been reached and the flow through outlet 56 would not commence until that temperature is reached. Computer keyboard 62 would also control the dwell time of each container 44 at the dispensing station beneath spout 56. Carousel 42 includes a basket 66 at each container location with a filtration or food preparation device such as device 10 or device 20 mounted in the basket.

Valve 58 may, for example, be a slide valve controlled by the actuation of solenoid 60 so that the slide valve progressively moves into and out of the opening of spout 56 and thereby controls the degree of flow through the spout from a condition of the spout being completely opened to the spout being completely closed.

The carousel type arrangement such as shown in FIG. 6 could be utilized for making baby formula where the containers 44 are sterilized baby bottles.

FIG. 7 illustrates a modified form of system 70 which incorporates the practice of this invention. As shown therein the system 70 includes a housing 72 which could be similar to conventional coffee makers having a platform 74 and a water compartment 76. A container such as a cup 78 could be mounted on platform 72. A lid 80 having a dispensing outlet 81 would detachably cover the cup 78 and would include a basket portion 82 into which a device such as device 10 or 20 would be mounted over the basket outlet. Water or other liquid would be discharged through spout 84 as controlled by valve 86 and then flow through outlet 81 into container 78. A temperature sensor 88 could also be provided so that operation of the dispensing would be controlled by computer key pad 90 through the use of computer technology employing computer chips or other known means. Data could be entered to control the amount and duration of water flow through spout 84 as well as other parameters such as the temperature of the water.

It is to be understood that although special water or liquid reservoirs have been indicated in FIGS. 6–7, the water source could be from other means including a conventional water spigot which may be modified by attachment of a valve and other "hardware" if it is to be computer controlled.

Figure 8:
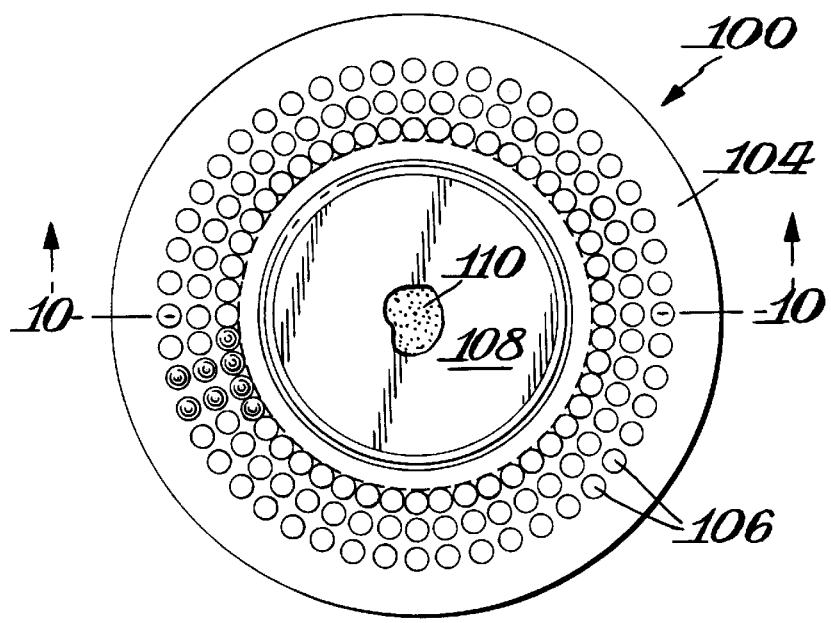
FIG. 8 is a top plan view partly broken away of yet another form of filtration device in accordance with this invention.
Figure 10:
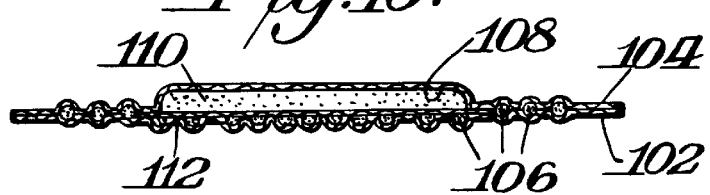
FIG. 10 is a cross-sectional view taken through FIG. 8 along the line 10—10.
Figure 9:
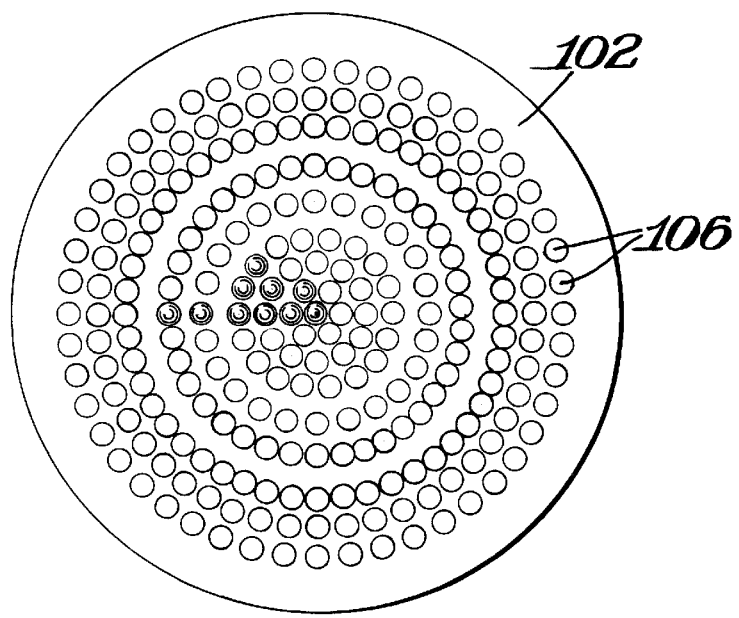
FIG. 9 is a bottom plan view of the device shown in FIG. 8.

FIGS. 8–10 show a further device 100 in accordance with this invention which is a variation of the devices 10 and 20. Device 100 could be a form of filtration device which is a modified form of the type of filter shown and described in U.S. Pat. No. 5,304,305 and in Ser. No. 239,581. As illustrated in FIGS. 8–10 the device 100 includes a pair of outer layers 102,104 and central layer 112 which are secured together to form a composite having a plurality of pockets 106 in any suitable array such as described in the aforesaid patent and application. The pockets 106 could include pockets between layers 102,104 which extend radially outwardly of the central area as shown in FIG. 8. Additional centrally located pockets are between layers 102,112. A single enlarged pocket 108 is formed in the central area between layers 104,112. The single enlarged pocket could contain food concentrate while the smaller pockets 108 could contain filter material or other types of food concentrate. Enlarged pocket 106 thus functions as a food preparation applicator which has mounted therein the food concentrate 110 in powdered or granular form to act as dispensing structure when water or other liquid flows through the central fluid contact region. If desired, the food concentrate could be disposed in the pockets 106 at the central portion of the device 100 in the fluid contact region and the enlarged pocket 108 could include the filter material.

Preferably the device 100 would be formed by having one or more of layers 102,104,112 made fluid impervious except at the location of the pockets as described in the aforesaid patent and application.

It is to be understood that the invention may be practiced with devices of any suitable size or shape. Thus, FIGS. 11–13 illustrate a modified device 120 constructed similarly to device 100 in that it includes an inner layer 130 and a pair of outer layers 122,124 with small pockets 126 formed between outer layer 124 inner layer 130. An enlarged pocket 128 is formed between layers 122 and 130. In the embodiment shown in FIGS. 11–13 the device 120 is of generally rectangular shape with the single outer pocket 128 containing food concentrate 132 and with the smaller pockets 126 containing treating material 134 such as filter material and/or additional food additive material. FIG. 12 shows a geometric shape which includes a concentric circular arrays of pockets 126 in the central fluid contact region with the arrays becoming arcuate outwardly of the central region.

The invention lends itself to various forms of practice. For example, in certain applications the filter side of the device could be placed upstream or upwardly and the food concentrate side would thus be downstream or downwardly so that the water or other liquid is filtered before it contacts and mixes with the food concentrate. Alternatively, it may be desired to first obtain the mixture and then achieve the filtering action. In such applications the food concentrate side would be upstream or upwards and the filtering side would be downstream. In other instances it may be desired that there be no alteration of the contents such as by any filtering, in which case only food concentrate would be provided by having the food concentrate in a layer as in device 10 of FIGS. 1–2 or by modifying the various other devices so that there is only one set of pockets which is either a single enlarged pocket or a plurality of smaller pockets with the food concentrate being therein. Alternatively, two sets of pockets could be provided with the food concentrate in both sets of pockets.

Where the pockets are used to contain filter material suitable materials could include activated carbon particularly activated charcoal, or silica or silicates or aluminates (or derivatives or combinations or modifications thereof) or bentonites or zeolites or other clay or non-clay minerals, or chitin (including other derivatives of chitin such as chitosan) to clarify or decontaminate or regenerate or remove any contaminants from the fluid. The additives or food concentrates could include powdered creme or sugar which dissolve in the fluid or could include other powdered flavoring material such as coffee grounds, tea, cocoa, baking or cooking mixes, juices, flavors, milk, soup and dry powder infant formula.

It is to be understood that various features in various alternative forms of the devices may be incorporated in other devices within the spirit of this invention.

What is claimed is:

1. A food preparation device comprising a composite formed by a first outer layer, a second outer layer remote from said first outer layer, an intermediate layer between said first outer layer and said second outer layer, at least one first pocket located between said first outer layer and said intermediate layer, said first pocket being liquid impervious outwardly of its periphery and being liquid pervious in its space within said periphery, treating material in said space of said first pocket, at least one second pocket between said intermediate layer and said second outer layer, said second pocket being liquid impervious outwardly of its periphery and being liquid pervious in its space within said periphery, food concentrate in said space of said second pocket, each of said first outer layer and said second outer layer and said intermediate layer being made of a material which is inherently liquid pervious at the locations of said first pocket and said second pockets whereby a liquid may pass through said layers, and said first pocket and said second pocket being in flow alignment whereby a liquid may sequentially pass through each of said layers and said pockets to be enhanced when being discharged through said composite.

2. The device of claim 1 wherein said treating material includes food additive material.

3. The device of claim 1 wherein said treating material in said first pocket comprises filter material for removing substances from the liquid.

4. The device of claim 1 wherein there are a plurality of second pockets.

5. The device of claim 1 wherein said food concentrate in said second pocket is selected from the group consisting of coffee, tea, cocoa, baking maxes, cooking mixes, juices, flavors, milk, soup, dry powder infant formula, powdered creme and sugar.

6. The device of claim 5 wherein said treating material in said first pocket is selected from the group consisting of powdered creme and sugar.

7. The device of claim 6 wherein said food concentrate in said second pocket is selected from the group consisting of coffee and tea.

8. A method of food preparation comprising providing a composite formed by upstream outer layer and a downstream outer layer and an intermediate layer therebetween with at least one upstream pocket between the upstream outer and the intermediate layers and at least one downstream pocket between the intermediate and downstream outer layers with each of the pockets being liquid impervious outwardly of its periphery and liquid pervious in its space within its periphery and with all of the layers made of a material which is inherently liquid pervious at the locations of the pockets, flowing a liquid through the upstream outer layer and through treating material in the liquid pervious space of the upstream pocket to treat the liquid, passing the treated liquid through the intermediate layer and food concentrate in the liquid pervious space of the second pocket to enhance the treated liquid, and discharging the enhanced treated liquid through the downstream layer.

9. The method of claim 8 wherein the food concentrate in the downstream pocket is selected from the group consisting of coffee, tea, cocoa, baking mixes, cooking mixes, juices, flavors, milk, soup, dry powder infant formula, powdered creme and sugar.

10. The method of claim 9 wherein the treating material in the upstream pocket is filter material.

11. The method of claim 10 wherein the treating material in the upstream pocket further includes food additive material.

12. The method of claim 9 wherein the treating material in the upstream pocket includes food additive material.

13. The method of claim 12 wherein the food additive material in the upstream pocket is selected from the group consisting of powdered creme and sugar.

14. The method of claim 13 wherein the food concentrate in the downstream pocket is selected from the group consisting of coffee and tea.

15. The device of claim 4 wherein said at least one first pocket comprises a single pocket, and filter material being in said second pocket.

16. The device of claim 1 including further second pockets disposed transversely outwardly of said single first pocket, and treating material being in said transversely outwardly pockets.

17. The device of claim 1 in combination with a dispensing basket having a base portion and a spout, and said device being mounted in said basket disposed above and upstream of said spout.

18. The china of claim 17 including a computer control assembly for controlling flow parameters of a liquid passing through said device.

19. The combination of claim 18 wherein said flow parameters include the flow time and flow rate and temperature of the liquid.

20. The combination of claim 16 including an electromechanical control for controlling flow parameters of a liquid passing through said device.

21. The method of claim 8 wherein the composite is placed in a dispensing basket, flowing the liquid through a spout above the basket and then through the composite and the basket, and collecting the enhanced treated liquid in a base portion below the basket.

* * * * *

UNITED STATES PATENT AND TRADEMARK OFFICE
CERTIFICATE OF CORRECTION

PATENT NO.: 5,958,478

DATED: SEPTEMBER 28, 1999

INVENTOR(S): ROBERT LEHRER

It is certified that an error appears in the above identified patent and that said Letters Patent is hereby corrected as shown below:

Col. 6, line 47 delete "china" and insert --combination--; and

Signed and Sealed this

Fifth Day of December, 2000

Attest:

Q. TODD DICKINSON

*Attesting Officer*  *Director of Patents and Trademarks*